(12) United States Patent
C H et al.

(10) Patent No.: US 11,438,254 B2
(45) Date of Patent: *Sep. 6, 2022

(54) APPARATUS AND METHOD TO TRACE PACKETS IN A PACKET PROCESSING PIPELINE OF A SOFTWARE DEFINED NETWORKING SWITCH

(71) Applicant: Telefonaktiebolaget LM Ericsson (publ), Stockholm (SE)

(72) Inventors: Vyshakh Krishnan C H, Bangalore (IN); Faseela K, Bangalore (IN); Siva Kumar V V K A Perumalla, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 26 days.

This patent is subject to a terminal disclaimer.

(21) Appl. No.: 17/041,234

(22) PCT Filed: Jun. 13, 2018

(86) PCT No.: PCT/IB2018/054346
§ 371 (c)(1),
(2) Date: Sep. 24, 2020

(87) PCT Pub. No.: WO2019/239190
PCT Pub. Date: Dec. 19, 2019

(65) Prior Publication Data
US 2021/0105199 A1    Apr. 8, 2021

(51) Int. Cl.
*H04L 12/26* (2006.01)
*H04L 43/10* (2022.01)
(Continued)

(52) U.S. Cl.
CPC .............. *H04L 43/10* (2013.01); *H04L 45/38* (2013.01); *H04L 49/3063* (2013.01)

(58) Field of Classification Search
None
See application file for complete search history.

(56) References Cited

U.S. PATENT DOCUMENTS

| 8,561,025 B1 | 10/2013 | Bisht et al. |
| 11,095,497 B2 | 8/2021 | Bisht et al. |

(Continued)

FOREIGN PATENT DOCUMENTS

| CN | 105791129 A | 7/2016 |
| WO | 2016/114750 A1 | 7/2016 |

(Continued)

OTHER PUBLICATIONS

Eichelberger, et al., "SFC Path Tracer: A Troubleshooting Tool for Service Function Chaining", IFIP/IEEE International Symposium on Integrated Network Management (IM2017), 2017, pp. 568-571.

(Continued)

*Primary Examiner* — Eunsook Choi
(74) *Attorney, Agent, or Firm* — Nicholson, De Vos, Webster & Elliott, LLP

(57) ABSTRACT

A method is implemented by a switch in a software defined networking (SDN) network to trace packets in a packet processing pipeline of the switch. The method includes creating a copy of a received packet to function as a trace packet. The method further includes, at each of one or more subsequent flow tables that the trace packet traverses, appending an identifier of that flow table to a recorded route of the trace packet and resubmitting the trace packet to that flow table to be processed without packet tracing. The method further includes sending, at an egress table, the trace packet to a controller along with the recorded route of the trace packet.

20 Claims, 8 Drawing Sheets

(51) Int. Cl.
*H04L 45/00* (2022.01)
*H04L 49/00* (2022.01)
*H04L 12/721* (2013.01)

(56) References Cited

U.S. PATENT DOCUMENTS

| | | |
|---|---|---|
| 2001/0037465 A1 | 11/2001 | Hart et al. |
| 2004/0049596 A1 | 3/2004 | Schuehler et al. |
| 2006/0022818 A1 | 2/2006 | Piltonen |
| 2008/0126877 A1 | 5/2008 | Alsup |
| 2009/0254468 A1 | 10/2009 | Acedo et al. |
| 2009/0292994 A1 | 11/2009 | Lwo |
| 2010/0005151 A1 | 1/2010 | Gokhale |
| 2011/0125892 A1 | 5/2011 | Rajan et al. |
| 2013/0176888 A1 | 7/2013 | Kubota et al. |
| 2013/0290639 A1 | 10/2013 | Tran et al. |
| 2013/0304915 A1 | 11/2013 | Kawai |
| 2014/0241356 A1 | 8/2014 | Zhang et al. |
| 2014/0286342 A1 | 9/2014 | Xia et al. |
| 2014/0301213 A1 | 10/2014 | Khanal et al. |
| 2015/0016286 A1 | 1/2015 | Ganichev et al. |
| 2015/0016298 A1 | 1/2015 | Igor et al. |
| 2015/0088823 A1 | 3/2015 | Chen et al. |
| 2015/0113132 A1 | 4/2015 | Srinivas et al. |
| 2015/0127805 A1 | 5/2015 | Hudgins et al. |
| 2015/0139238 A1 | 5/2015 | Pourzandi et al. |
| 2015/0172189 A1 | 6/2015 | Pitchai et al. |
| 2015/0256397 A1 | 9/2015 | Agarwal |
| 2015/0281036 A1* | 10/2015 | Sun .................. H04L 41/14 370/248 |
| 2015/0334045 A1 | 11/2015 | Tremblay et al. |
| 2016/0050131 A1 | 2/2016 | Zhang et al. |
| 2016/0105267 A1 | 4/2016 | Abel et al. |
| 2016/0112328 A1* | 4/2016 | Anand ................ H04L 43/026 370/236.2 |
| 2016/0142291 A1 | 5/2016 | Polland |
| 2016/0142301 A1 | 5/2016 | Anand |
| 2016/0226578 A1 | 8/2016 | Yuan et al. |
| 2016/0227598 A1 | 8/2016 | Singh |
| 2016/0234068 A1 | 8/2016 | Dolganow et al. |
| 2016/0274976 A1 | 9/2016 | Manjunath et al. |
| 2016/0301601 A1 | 10/2016 | Anand et al. |
| 2016/0380874 A1* | 12/2016 | Sun ....................... H04L 45/64 370/254 |
| 2017/0019152 A1 | 1/2017 | Kim et al. |
| 2017/0068684 A1 | 3/2017 | Hahn |
| 2017/0155574 A1 | 6/2017 | Mullin et al. |
| 2018/0063072 A1 | 3/2018 | Wackerly et al. |
| 2018/0115466 A1 | 4/2018 | Ganjisaffar et al. |
| 2018/0227209 A1 | 8/2018 | Lin |
| 2018/0287932 A1 | 10/2018 | Calderon et al. |
| 2019/0229977 A1* | 7/2019 | Bisht .................. H04L 41/0645 |
| 2020/0344143 A1* | 10/2020 | K ............................ H04L 43/10 |

FOREIGN PATENT DOCUMENTS

| | | |
|---|---|---|
| WO | 2017/118875 A1 | 7/2017 |
| WO | 2018/046988 A1 | 3/2018 |
| WO | 2018/203108 A1 | 11/2018 |
| WO | 2019/043435 A1 | 3/2019 |

OTHER PUBLICATIONS

Handigol, et al., "Where is the Debugger for my Software Defined Network?," ACM, HotSDN'12, Aug. 13, 2012, Helsinki, Finland, 6 pages.

Kawai, et al., "Per-Flow Entry Verification for Legacy SDN", The 22nd Asia-Pacific Conference on Communications (APCC2016), IEEE, Aug. 2016, pp. 502-510.

Open Networking Foundation, "OpenFlow Switch Specification," V 1.5.0 (protocol version 0x06), ONF TS-020, Dec. 19, 2014, pp. 1-277.

Zhi, et al., "MED: The Monitor-Emulator-Debugger for Software-Defined Networks", IEEE INFOCOM 2016—The 35th Annual IEEE International Conference on Computer Communications, IEEE, Apr. 10, 2016, 9 pages.

* cited by examiner

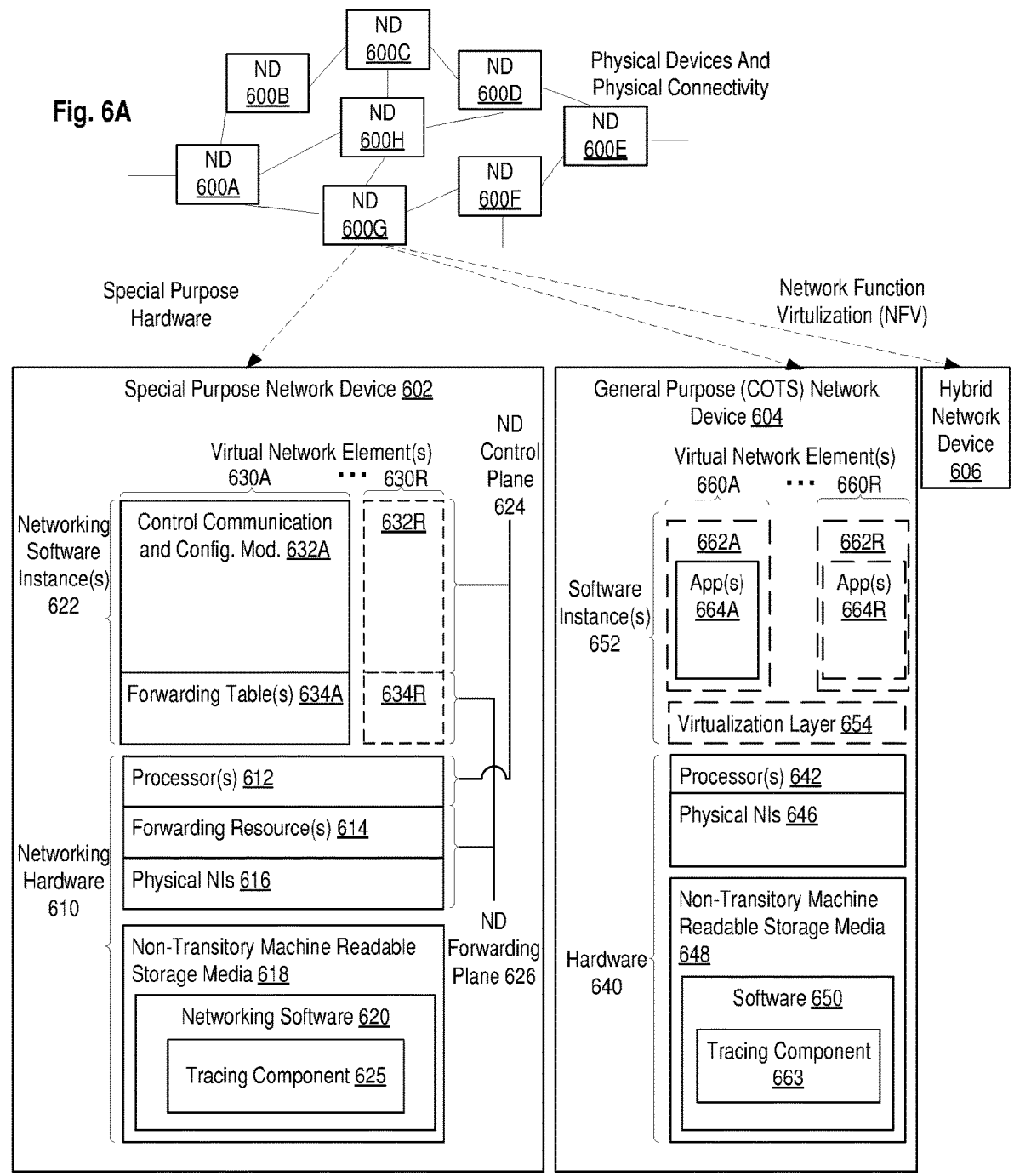
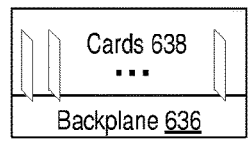

APPARATUS AND METHOD TO TRACE PACKETS IN A PACKET PROCESSING PIPELINE OF A SOFTWARE DEFINED NETWORKING SWITCH

CROSS-REFERENCE TO RELATED APPLICATIONS

This application is a national stage of International Application No. PCT/IB2018/054346, filed Jun. 13, 2018, which is hereby incorporated by reference.

TECHNICAL FIELD

Embodiments of the invention relate to the field of software defined networking (SDN), and more specifically, to tracing packets in a packet processing pipeline of an SDN switch.

BACKGROUND ART

Software defined networking (SDN) is an approach to computer networking that employs a split architecture network in which the forwarding (data) plane is decoupled from the control plane. The use of a split architecture network simplifies the network devices (e.g., switches) implementing the forwarding plane by shifting the intelligence of the network into one or more SDN controllers that oversee the switches. SDN facilitates rapid and open innovation at the network layer by providing a programmable network infrastructure. An SDN network typically includes multiple switches interconnected with each other and one or more SDN controllers that control the forwarding behavior of the switches.

OpenFlow is a southbound communications protocol that enables SDN controllers and switches in an SDN network to communicate control plane information with each other. An OpenFlow switch includes a packet processing pipeline that includes one or more flow tables. Each flow table includes one or more flow entries, where each flow entry specifies a packet matching criteria and a set of instructions to execute when an incoming packet matches the packet matching criteria. The set of instructions may instruct the switch to perform various operations on the packet including, but not limited to, forwarding the packet to a given port, modifying certain bits in the packet header, encapsulating the packet, dropping the packet, and directing the packet to another flow table.

The packet processing pipeline of an OpenFlow switch can become extremely complex. For example, an SDN controller may program the packet processing pipeline of a switch to include multiple flow tables and multiple flow entries within those flow tables. The flow entries can include instructions that direct packets to other flow tables in the packet processing pipeline. With such a complex packet processing pipeline, when a packet does not traverse its intended packet processing path, it can become extremely difficult to troubleshoot.

Packet tracing techniques can be used to help troubleshoot a packet that does not traverse the intended packet processing path. Existing packet tracing techniques typically require a switch to send the packet being traced to the controller at every flow table that the packet traverses in the packet processing pipeline. This consumes valuable control channel bandwidth and also requires the controller to collate the packets it receives to determine which packets are part of the same flow and to keep track of the traversed path. This can become complex for the controller, especially if the packet being traced is modified through the packet processing pipeline.

SUMMARY

A method is implemented by a switch in a software defined networking (SDN) network to trace packets in a packet processing pipeline of the switch. The method includes receiving a packet, responsive to a determination at a trace table in the packet processing pipeline that the packet matches a trace criteria, creating a copy of the packet that is to function as a trace packet, setting a first trace indicator of the trace packet, setting a second trace indicator of the trace packet, and directing the trace packet to a subsequent flow table, at each of one or more subsequent flow tables in the packet processing pipeline that the trace packet traverses, responsive to a determination that the first trace indicator of the trace packet is set, appending an identifier of that flow table to a recorded route of the trace packet, clearing the first trace indicator of the trace packet, resubmitting the trace packet to that flow table, and setting the first trace indicator of the trace packet to a value of the second trace indicator of the trace packet before directing the trace packet to a subsequent flow table, and responsive to a determination at an egress flow table in the packet processing pipeline that the first trace indicator of the trace packet is set, sending the trace packet to a controller along with the recorded route of the trace packet.

A network device configured to function as a switch in a software defined networking (SDN) network to trace packets in a packet processing pipeline of the switch. The network device includes a set of one or more processors and a non-transitory machine-readable storage medium having stored therein a tracing component. The tracing component, when executed by the set of one or more processors, causes the switch to receive a packet, responsive to a determination at a trace table in the packet processing pipeline that the packet matches a trace criteria, create a copy of the packet that is to function as a trace packet, set a first trace indicator of the trace packet, set a second trace indicator of the trace packet, and direct the trace packet to a subsequent flow table, at each of one or more subsequent flow tables in the packet processing pipeline that the trace packet traverses, responsive to a determination that the first trace indicator of the trace packet is set, append an identifier of that flow table to a recorded route of the trace packet, clear the first trace indicator of the trace packet, resubmit the trace packet to that flow table, and set the first trace indicator of the trace packet to a value of the second trace indicator of the trace packet before directing the trace packet to a subsequent flow table, and response to a determination at an egress flow table in the packet processing pipeline that the first trace indicator of the trace packet is set, send the trace packet to a controller along with the recorded route of the trace packet.

A non-transitory machine-readable medium has computer code stored therein, which when executed by a set of one or more processors of a network device functioning as a switch in a software defined networking (SDN) network, causes the switch to perform operations for tracing packets in a packet processing pipeline of the switch. The operations include receiving a packet, responsive to a determination at a trace table in the packet processing pipeline that the packet matches a trace criteria, creating a copy of the packet that is to function as a trace packet, setting a first trace indicator of the trace packet, setting a second trace indicator of the trace packet, and directing the trace packet to a subsequent flow table, at each of one or more subsequent flow tables in the packet processing pipeline that the trace packet traverses, responsive to a determination that the first trace indicator of the trace packet is set, appending an identifier of that flow table to a recorded route of the trace packet, clearing the first trace indicator of the trace packet, resubmitting the trace packet to that flow table, and setting the first trace indicator of the trace packet to a value of the second trace indicator of the trace packet before directing the trace packet to a subsequent flow table, and responsive to a determination at an egress flow table in the packet processing pipeline that the first trace indicator of the trace packet is set, sending the trace packet to a controller along with the recorded route of the trace packet.

BRIEF DESCRIPTION OF THE DRAWINGS

The invention may best be understood by referring to the following description and accompanying drawings that are used to illustrate embodiments of the invention. In the drawings:

FIG. 6A illustrates connectivity between network devices (NDs) within an exemplary network, as well as three exemplary implementations of the NDs, according to some embodiments.

FIG. 6B illustrates an exemplary way to implement a special-purpose network device according to some embodiments.

DETAILED DESCRIPTION

Figure 1:
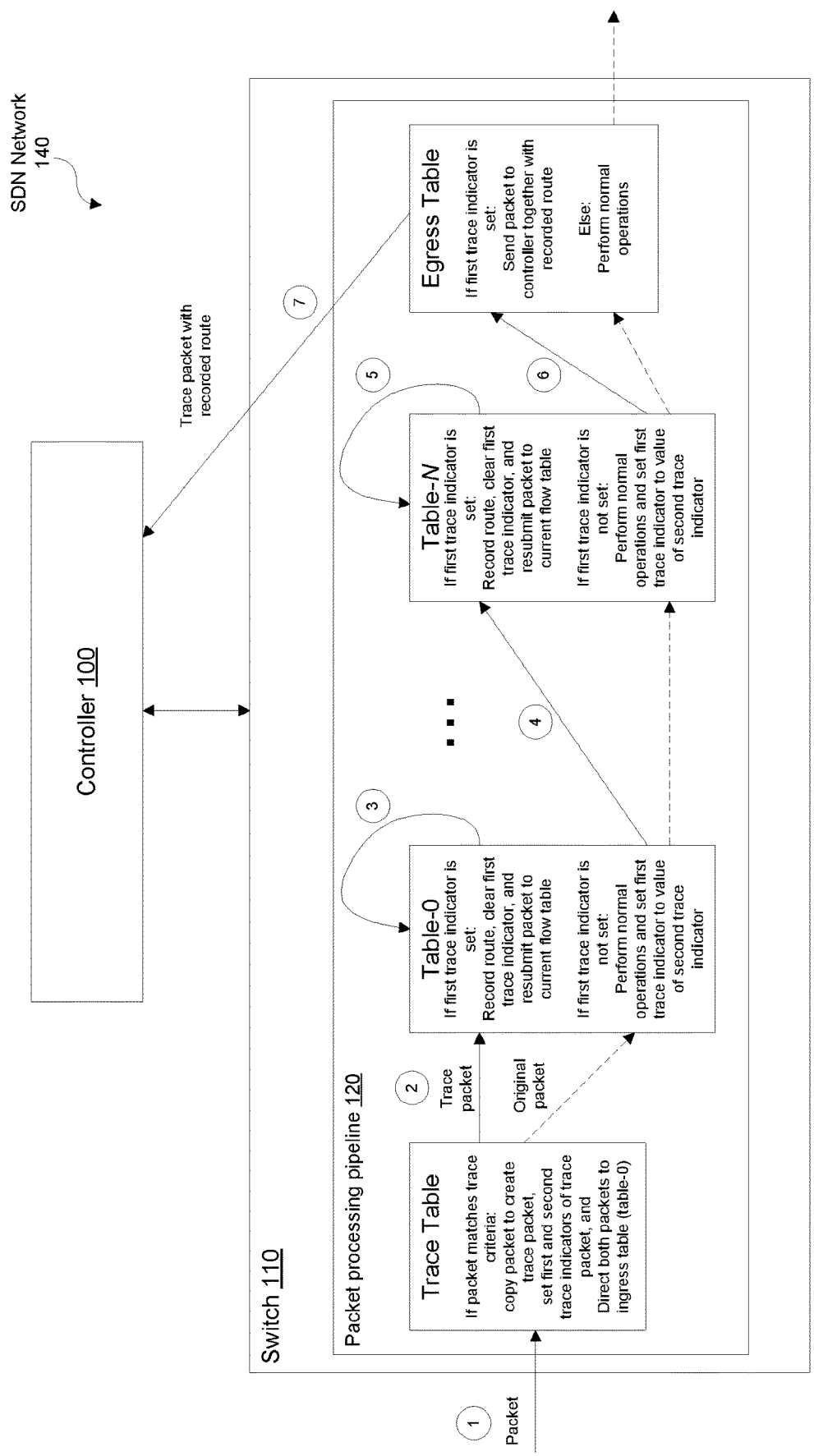
FIG. 1 is a diagram illustrating operations for tracing a packet in a packet processing pipeline of an SDN switch, according to some embodiments.

The following description describes methods and apparatus for tracing packets in a packet processing pipeline of a software defined networking (SDN) switch. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments. However, such notation should not be taken to mean that these are the only options or optional operations, and/or that blocks with solid borders are not optional in certain embodiments.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

As mentioned above, packet processing pipelines in SDN switches are becoming increasingly complex. As a result, when packets do not traverse their intended packet processing path, it can become extremely difficult to troubleshoot. Packet tracing techniques can be used to help troubleshoot a packet that does not traverse the intended packet processing path. Existing packet tracing techniques typically require a switch to send the packet being traced to the controller at every flow table that the packet traverses in the packet processing pipeline. This consumes valuable control channel bandwidth and also requires the controller to collate the packets it receives to determine which packets are part of the same flow and to keep track of the traversed path. This can become complex for the controller, especially if the packet being traced is modified through the packet processing pipeline.

Embodiments disclosed herein improve upon existing packet tracing techniques by only sending a single packet to the controller per switch along with an indication of the complete route that the packet traversed in the packet processing pipeline (e.g., the flow tables and groups that the packet traversed) instead of sending the packet to the controller at every flow table that the packet traverses in the packet processing pipeline, as done in existing packet tracing techniques. This saves control channel bandwidth and provides more efficient/optimized packet tracing. Various embodiments are further described and claimed herein below.

FIG. 1 is a diagram illustrating operations for tracing a packet in a packet processing pipeline of an SDN switch, according to some embodiments. The diagram shows an SDN network 140 that includes an SDN controller 100 (referred to simply as controller 100) and an SDN switch 110 (referred to simply as switch 110). The controller 100 is communicatively coupled to the switch 110 and is responsible for managing the switch 110. For example, the controller 100 may program the packet processing pipeline 120 of the switch 110 using a southbound protocol (e.g., OpenFlow) to control the forwarding behavior of the switch 110 and to enable the packet tracing functionality described herein.

The packet processing pipeline 120 of the switch 110 may include one or more flow tables. Each flow table can include one or more flow entries, where each flow entry includes a packet matching criteria and a set of instructions. When an incoming packet matches the packet matching criteria of a flow entry, the corresponding set of instructions of that flow entry are executed. A packet is said to match a flow entry if the packet matches the packet matching criteria of that flow entry. The set of instructions of a flow entry may include instructions for the switch to perform various operations on a matching packet including, but not limited to, forwarding the packet to a given port, modifying certain bits in the packet header, encapsulating the packet, dropping the packet, and directing the packet to another flow table.

For purposes of illustration, the SDN network 140 is shown as including a single controller 100 and a single switch 110. It should be understood, however, that the SDN network 140 may include more than one controller 100 and will typically include more than one switch 110. Also, for purposes of illustration, embodiments will primarily be described in a context where the SDN controller 100 and the switch 110 implement OpenFlow. This is by way of example and not intended to be limiting. It should be understood that the packet tracing techniques and concepts described herein can also be implemented using other SDN implementations.

In this example, the packet processing pipeline 120 of the switch 110 includes a trace table, normal flow tables (table-0 to table-N), and an egress table. The trace table is a flow table that is used to enable packet tracing for packets that need to be traced. In one embodiment, the trace table is the first (foremost) flow table in the packet processing pipeline 120 (it is the first flow table against which incoming packets are matched). As shown in the diagram, in one embodiment, the trace table is programmed to cause a packet to be processed in the following manner: if a packet matches a trace criteria, then create a copy of the packet to function as a trace packet, set a first trace indicator and a second trace indicator of the trace packet (the copy), and direct the original packet and the trace packet to the ingress table.

The normal flow tables (table-0 to table-N) are flow tables that are used for normal (non-tracing) packet processing. In one embodiment, one or more of these flow tables are programmed to support packet tracing functionality (in addition to supporting normal packet processing functionality). As shown in the diagram, in one embodiment, one or more of these flow tables are programmed to cause a packet to be processed in the following manner: if the first trace indicator of the packet is set (indicating that the packet is a trace packet), then append an identifier of the current flow table to a recorded route of the packet, clear the first trace indicator of the packet, and resubmit the packet to the current flow table; otherwise (if the first trace indicator of the packet is not set), then perform normal packet processing operations and set the value of the first trace indicator to the value of the second trace indicator before directing the packet to another flow table.

The egress table is a flow table to which packets are directed to before they exit a physical port of the switch 110. The egress table can be used to send trace packets to the controller 100. In some embodiments, an existing egress flow table is programmed to support this functionality, while in other embodiments a new egress table is added to the packet processing pipeline 120 to support this functionality. As shown in the diagram, in one embodiment, the egress table is programmed to cause a packet to be processed in the following manner: if the first trace indicator of the packet is set, then send the packet to the controller along with the recorded route of the packet; otherwise (if the first trace indicator of the packet is not set), then perform normal egress operations.

Exemplary packet tracing operations will now be described with reference to the diagram. At operation 1, the switch 110 receives a packet. Packet processing for the packet begins at the trace table of the packet processing pipeline 120. In this example, it is assumed that the packet matches a trace criteria. As such, the switch 110 creates a copy of the packet to function as a trace packet, sets the first trace indicator and the second indicator of the trace packet (the copy) (to indicate that packet tracing is enabled), and at operation 2, directs the trace packet to the ingress table (i.e., the first flow table where normal (non-tracing) packet processing begins), which in this example is table-0. The trace packet is a copy of the original packet that will be traced through the packet processing pipeline 120. As will become apparent from the descriptions provided further herein below, setting the first trace indicator of the trace packet and the second trace indicator of the trace packet enables the trace packet to be traced through the packet processing pipeline 120. In one embodiment, the first trace indicator is a bit in a metadata field (e.g., OpenFlow metadata field) associated with the trace packet and the second trace indicator is a bit in a packet register associated with the trace packet (e.g., where a value of 1 indicates packet tracing is enabled and a value of 0 indicates packet tracing is disabled). The original packet is also directed to the ingress table (table-0) and is to be processed through the packet processing pipeline 120 normally (without packet tracing functionality, as shown in the diagram by the dashed arrows). Thus, the original packet is not impacted by the packet tracing functionality.

Continuing with the example, the trace packet arrives at table-0 with its first trace indicator set (since the first trace indicator was previously set at the trace table). Thus, the switch 110 appends the identifier of table-0 to the recorded route of the trace packet, clears the first trace indicator of the trace packet (to indicate that packet tracing is disabled), and at operation 3, resubmits the trace packet to table-0. The recorded route of the trace packet can be stored in any field or data structure that is associated with the trace packet and is persisted with the trace packet as the trace packet is processed through the packet processing pipeline 120. When the trace packet is resubmitted to table-0, since the first trace indicator of the trace packet is not set (since the first trace indicator was cleared before the trace packet was resubmitted), the switch 110 performs normal packet processing operations and sets the value of the first trace indicator of the trace packet to the value of the second trace indicator of the trace packet before directing the trace packet to table-N at operation 4. The second trace indicator of the trace packet was previously set at the trace table. As such, setting the value of the first trace indicator to the value of the second trace indicator causes the first trace indicator to be set. This allows the trace packet to be traced at the next flow table (table-N).

It should be noted that, in general, the second trace indicator of a trace packet remains set as the trace packet is processed through the packet processing pipeline 120 and is used to set the first trace indicator of the trace packet before the trace packet is directed to another flow table (to enable packet tracing at the next flow table). Also, the first trace indicator of the trace packet is cleared before being resubmitted to a flow table to allow the trace packet to be processed at that flow table normally (without packet tracing).

Continuing with the example, the trace packet arrives at table-N with its first trace indicator set (since the first indicator was previously set at table-0 before the trace packet was directed to table-N). Thus, the switch 110 appends the identifier of table-N to the recorded route of the trace packet, clears the first trace indicator of the trace packet, and at operation 5, resubmits the trace packet to table-N. When the trace packet is resubmitted to table-N, since the first trace indicator of the trace packet is not set (since the first trace indicator was cleared before the trace packet was resubmitted), the switch 110 performs normal operations and sets the value of the first trace indicator of the trace packet to the value of the second trace indicator of the trace packet before directing the trace packet to the egress table at operation 6. In this example, the second trace indicator of the trace packet was previously set at the trace table (and remained set as the trace packet was processed through the packet processing pipeline 120). As such, setting the value of the first trace indicator to the value of the second trace indicator causes the first trace indicator to be set. This allows the trace packet to be traced at the next flow table (egress table).

Continuing with the example, the trace packet arrives at the egress table with its first trace indicator set (since it was previously set at table-N before the trace packet was directed to the egress table). Thus, at operation 7, the switch 110 sends the trace packet to the controller 100 along with the recorded route. In this example, the recorded route indicates that the trace packet traversed table-0 and table-N. In one embodiment, the trace packet is sent to the controller using an OpenFlow Packet-In message or similar control plane message.

In this manner, embodiments send a single packet to the controller 100 along with the complete route that the trace packet traversed though the packet processing pipeline 120. This is an improvement over existing packet tracing techniques that send a packet to the controller at every flow table that the packet traverses. For example, for a packet that traverses table-0 and table-N (similar to the example above), existing packet tracing techniques would send the packet to the controller once when the packet reaches table-0 and again when the packet reaches table-N. The controller 100 would then have to collate these packets to determine that they are in fact the same packet and reconstruct the path that the packet traversed based on the flow tables that these packets were sent from. In contrast, embodiments disclosed herein provides the controller 100 with the complete route that the packet traversed through the packet processing pipeline 120 (the recorded route) with a single packet, which alleviates the controller 100 from having to collate packets and from having to reconstruct the path that the packet traversed.

In one embodiment, the controller 100 can use the recorded routes collected from one or more switches to calculate various statistics such as the number of packets that have gone through each service (services are typically associated with a particular flow table), the number of services a particular packet traversed, the number of packets gone through a particular Virtual Private Network (VPN) (e.g., by inspecting the path traversed and the VPN ID in metadata), and the number of packets gone through a particular Emulated Local Area Network (ELAN).

As mentioned above, the trace table is used to enable packet tracing for packets that need to be traced. Table I shows an exemplary flow entry that can be included in a trace table to provide this functionality.

TABLE I

| Packet Matching Criteria | Instructions |
| --- | --- |
| Trace criteria (e.g., specified by administrator) | Create a copy of the packet; Set the first trace indicator of the trace packet; Set the second trace indicator of the trace packet; Direct the original packet to the ingress table; and Direct the trace packet to the ingress table |

As shown in Table I, the flow entry matches packets that fit a trace criteria. In one embodiment, the trace criteria can be configured by an administrator (to selectively trace particular flows or packets). The flow entry has instructions to create a copy of the packet (to function as the trace packet), set the first trace indicator of the trace packet, set the second trace indicator of the trace packet, direct the original packet to the ingress table, and direct the trace packet to the ingress table.

As mentioned above, the normal flow tables (e.g., table-0 to table-N) can be programmed to support packet tracing functionality. Table II shows exemplary flow entries in a flow table before the flow table is programmed to support packet tracing functionality and Table III shows the exemplary flow entries in the flow table after the flow table has been programmed to support packet tracing functionality.

TABLE II

| Packet Matching Criteria | Instructions |
| --- | --- |
| Criteria-X | Direct packet to table-X |
| Criteria-Y | Direct packet to table-Y |
| Criteria-Z | Direct packet to table-Z |

As shown in Table II, each of the flow entries matches packets having a certain packet matching criteria (criteria-X, criteria-Y, and criteria-Z, respectively) and has instructions to direct matching packets to a certain flow table (table-X, table-Y, and table-Z, respectively).

TABLE III

| Packet Matching Criteria | Instructions |
| --- | --- |
| First trace indicator is set | Record-route(table-ID); Clear first trace indicator; and Resubmit packet to current flow table |
| Criteria-X | Set the value of the first trace indicator to the value of the second trace indicator; and Direct packet to table-X |
| Criteria-Y | Set the value of the first trace indicator to the value of the second trace indicator; and Direct packet to table-Y |
| Criteria-Z | Set the value of the first trace indicator to the value of the second trace indicator; and Direct packet to table-Z |

As shown in Table III, a new flow entry is added to the flow table that matches packets having their first trace indicator set (which indicates that the packet is a trace packet). This new flow entry has instructions to append the identifier of the current flow table to the recorded route of the packet (record-route(table-ID)), clear the first trace indicator, and resubmit the packet to the current flow table. Also, as shown in Table III, the existing flow entries (the flow entries shown in Table II) are modified to include an instruction to set the value of the first trace indicator to the value of the second trace indicator before directing the packet to another flow table. It should be noted that trace packets will always have their second trace indicator set. Thus, setting the value of the first trace indicator to the value of the second trace indicator causes the first trace indicator to be set. This allows trace packets to be traced at the next flow table.

As mentioned above, an egress table is used to send trace packets to the controller 100. Table IV shows an exemplary flow entry that can be included in an egress table to provide this functionality.

TABLE IV

| Packet Matching Criteria | Instructions |
| --- | --- |
| First trace indicator is set | Output packet to controller |

As shown in Table IV, the flow entry matches packets that have their first trace indicator set and has instructions for the switch to output matching packets to the controller 100. The egress table can include other flow entries (not shown) to perform egress operations (e.g., for non-trace packets). In one embodiment, the flow entry shown in Table IV is the highest priority flow entry in the egress table. This ensures that trace packets will be sent to the controller 100 and not be forwarded out of the switch 110.

Figure 2:
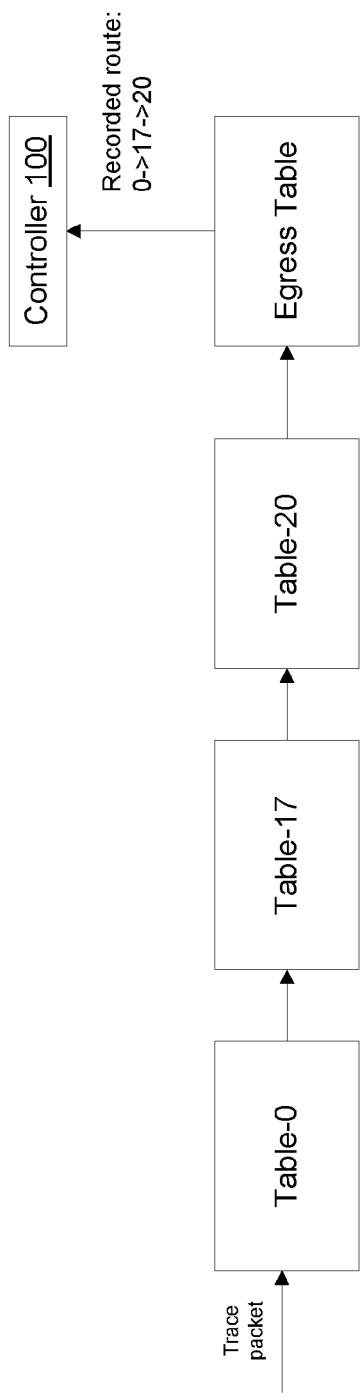
FIG. 2 is a diagram illustrating an exemplary route that the trace packet traverses and the resulting recorded route, according to some embodiments.

FIG. 2 is a diagram illustrating an exemplary route that the trace packet traverses and the resulting recorded route, according to some embodiments. In this example, the trace packet traverses table-0, table-17, and table-20 before reaching the egress table. When the trace packet arrives at a flow table, the identifier of that flow table is appended to the recorded route of the trace packet. Thus, by the time the trace packet reaches the egress table, the recorded route of the trace packet is "0→17→20." This recorded route is sent to the controller 100 from the egress table.

Embodiments also support recording the groups that a packet traverses in the packet processing pipeline 120. In OpenFlow, a group includes one or more buckets, where each bucket specifies one or more actions (instructions) to perform on a packet. There are various group types in OpenFlow (e.g., all, select, indirect, and fast failover). The "all" group type in OpenFlow indicates that all buckets in the group are to be executed. This can be used for multicast or broadcast forwarding. The packet is effectively cloned for each bucket and the actions of that bucket are applied. Packet tracing for groups has to be handled differently from flow tables, as groups do not allow checking for conditions (e.g., checking whether the first trace indicator is set). In one embodiment, a group is programmed to support packet tracing functionality by modifying each bucket in the group to include an instruction to append the identifier of the group to the recorded route of the packet (this approach is referred to as the first group recording approach). Table V shows exemplary buckets in a group before the group has been programmed to support packet tracing functionality and Table VI shows exemplary buckets in the group after the group has been programmed to support packet tracing functionality using the first group recording approach.

TABLE V

| Bucket | Instructions |
| --- | --- |
| Bucket-1 | Instruction-X; and |
| | Direct packet to table-X |
| Bucket-2 | Instruction-Y; and |
| | Direct packet to table-Y |

As shown in Table V, the group includes two buckets (bucket-1 and bucket-2). Bucket-1 includes instruction-X (which can be any instruction) and an instruction to direct the packet to table-X and bucket-2 includes instruction-Y (which can be any instruction) and an instruction to direct the packet to table-Y.

TABLE VI

| Bucket | Instructions |
| --- | --- |
| Bucket-1 | Record-route(group-ID); |
| | Instruction-X; and |
| | Direct packet to table-X |
| Bucket-2 | Record-route(group-ID); |
| | Instruction-Y; and |
| | Direct packet to table-Y |

As shown in table VI, the existing buckets (the buckets shown in Table V) are modified to include an instruction to append the identifier of the group to the recorded route of the packet (record-route(group-ID)).

Figure 3A:
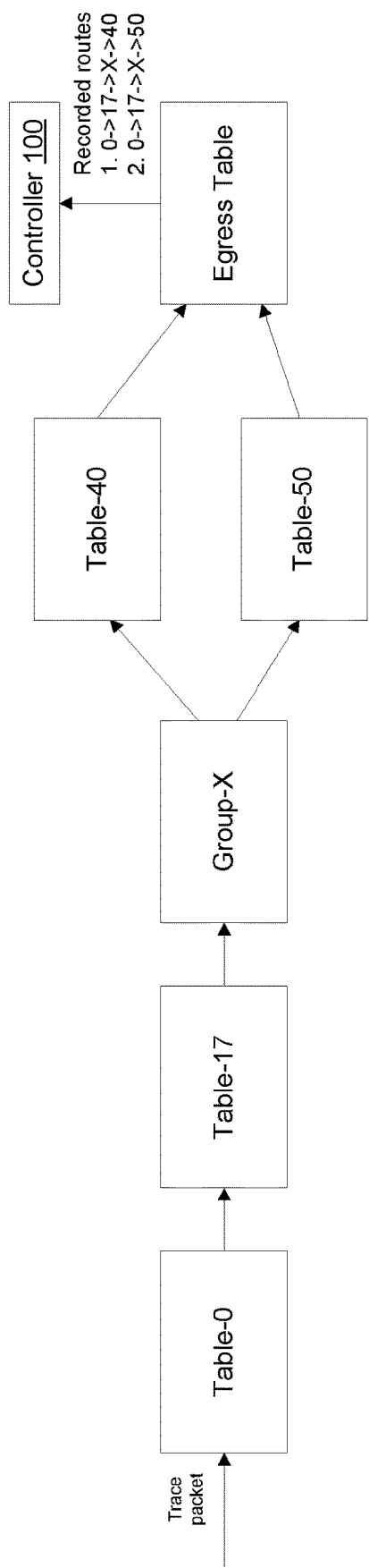
FIG. 3A is a diagram illustrating an exemplary route that the trace packet traverses and the resulting recorded route using the first group recording approach, according to some embodiments.

FIG. 3A is a diagram illustrating an exemplary route that the trace packet traverses and the resulting recorded route using the first group recording approach, according to some embodiments. In this example, the trace packet traverses table-0 and table-17 before reaching group-X. At this stage, the recorded route of the trace packet is "0→17." Group-X includes two buckets and is programmed to support packet tracing functionality in a similar manner to that described above with reference to Table V and Table VI. That is, each bucket includes an instruction to append the identifier of the group to the recorded route of the packet. The first bucket includes an instruction to direct packets to table-40 and the second bucket includes an instruction to direct packets to table-50. Thus, one copy of the trace packet is directed to table-40 and another copy of the trace packet is directed to table-50. Each copy is then directed to the egress table. As a result, the first copy has a recorded route of "0→17→X→40" and the second copy has a recorded route of "0→17→X→50." These recorded routes are sent to the controller 100 from the egress table.

A disadvantage of this approach is that the record-route action is applied at every bucket and thus adds additional overhead (even for normal (non-tracing) traffic). Another approach that avoids this disadvantage is to add a bucket to the group that has an instruction to append the identifier of the group to the recorded route of the packet (record-route (group-ID)) and direct the packet to the egress table (without modifying the existing buckets) (referred to as the second group recording approach). Table VII shows exemplary buckets in the group after the group has been programmed to support packet tracing functionality using this approach.

TABLE VII

| Bucket | Instructions |
| --- | --- |
| Bucket-1 | Instruction-X; and |
| | Direct packet to table-X |
| Bucket-2 | Instruction-Y; and |
| | Direct packet to table-X |
| Bucket-3 | Record-route(group-ID); and |
| | Direct packet to egress table |

As shown in Table VII, a new bucket (bucket-3) is added to the group that has instructions to append the identifier of the group to the recorded route of the packet and direct the packet to the egress table. With this approach, the overhead of applying the record-route action at every bucket (as done in the first group recording approach) is avoided. However, with this approach, bucket-3 may cause normal (non-tracing) packets to be directed to the egress table and cause these packets to potentially exit the switch, which may not be the intended behavior. To avoid this, bucket-3 may also include an instruction to set a drop indicator for a packet and the egress table may be programmed to drop any packets that have their drop indicator set. For example, the egress table may have the following rules in order of priority: 1) if first trace indicator is set, then output (punt) packet to controller; 2) if drop indicator is set, then drop packet; and 3) normal egress processing.

Figure 3B:
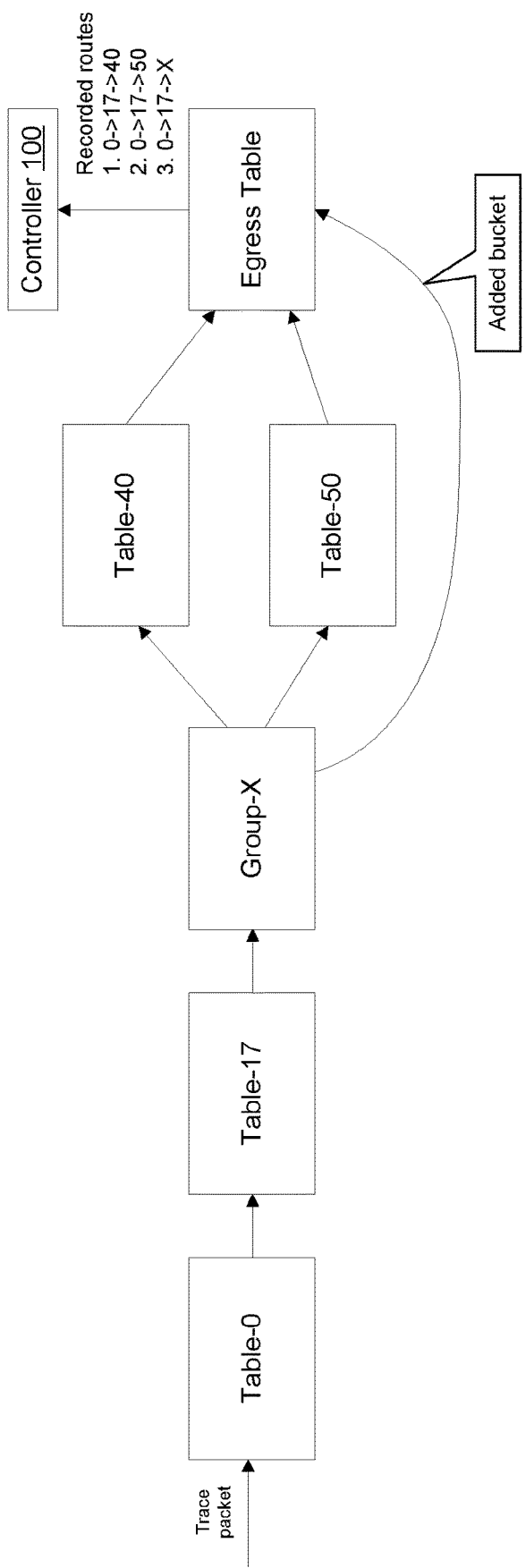
FIG. 3B is a diagram illustrating an exemplary route that the trace packet traverses and the resulting recorded route using the second group recording approach, according to some embodiments.

FIG. 3B is a diagram illustrating an exemplary route that the trace packet traverses and the resulting recorded route using the second group recording approach, according to some embodiments. In this example, the trace packet traverses table-0 and table-17 before reaching group-X. At this stage, the recorded route of the trace packet is "0→17." Group-X includes three buckets. The first bucket and the second bucket are the original buckets. The first bucket includes an instruction to direct the packet to table-40 and the second bucket includes an instruction to direct the packet to table-50. The third bucket is a bucket that has been added for packet tracing purposes and has an instruction to append the identifier of the group to the recorded route of the packet and an instruction to direct the packet to the egress table. Thus, a first copy of the trace packet is directed to table-40, a second copy of the trace packet is directed to table-50, and a third copy of the trace packet is directed to the egress table. The first copy and the second copy are subsequently directed to the egress table. As a result, the first copy has a recorded route of "0→17→40," the second copy has a recorded route of "0→17→50," and the third copy has a recorded route of "0→17→X." These recorded routes are sent to the controller 100 from the egress table.

In one embodiment, the length of the recorded route of a packet can be prevented from becoming too large by checking whether it has exceeded a maximum allowed length. The length of the recorded route may become too large, for example, when the packet is stuck in a loop. Table VIII shows an exemplary flow entry that can be added to a flow table (in addition to the existing packet tracing logic) to check for the length of the recorded route.

```
Action types:
enum ofp_action_type {
OFPAT_OUTPUT = 0, /* Output to switch port. */
OFPAT_COPY_TTL_OUT = 11, /* Copy TTL "outwards" -- from next-to-outermost to
outermost */
OFPAT_COPY_TTL_IN = 12, /* Copy TTL "inwards" -- from outermost to next-to-outermost
*/
OFPAT_SET_MPLS_TTL = 15, /* MPLS TTL */
OFPAT_DEC_MPLS_TTL = 16, /* Decrement MPLS TTL */
OFPAT_RECORD_ROUTE = 13, /* Push a new table-id/group-id*/
OFPAT_PUSH_VLAN = 17, /* Push a new VLAN tag */
OFPAT_POP_VLAN = 18, /* Pop the outer VLAN tag */
OFPAT_PUSH_MPLS = 19, /* Push a new MPLS tag */
OFPAT_POP_MPLS = 20, /* Pop the outer MPLS tag */
OFPAT_SET_QUEUE = 21, /* Set queue id when outputting to a port */
OFPAT_GROUP = 22, /* Apply group. */
OFPAT_SET_NW_TTL = 23, /* IP TTL. */
OFPAT_DEC_NW_TTL = 24, /* Decrement IP TTL. */
OFPAT_SET_FIELD = 25, /* Set a header field using OXM TLV format. */
OFPAT_PUSH_PBB = 26, /* Push a new PBB service tag (I-TAG) */
OFPAT_POP_PBB = 27, /* Pop the outer PBB service tag (I-TAG) */
OFPAT_EXPERIMENTER = 0xffff
};
Record-route action uses the following structure:
/* Action structure for OFPAT_RECORD_ROUTE. */
struct ofp_action_record_route {
uint16_t type; /* OFPAT_RECORD_ROUTE. */
uint16_t len; /* Length is 8. */
uint32_t id; /* TABLE-ID/GROUP-ID */
uint8_t pad[3];
};
```

TABLE VIII

| Packet Matching Criteria | Instructions |
| --- | --- |
| First trace indicator is set AND length of recorded route > max_length | Output to controller |
| First trace indicator is set | Record-route(table-ID); Clear first trace indicator; and Resubmit packet to current flow table |

As shown in table VIII, an additional flow entry can be added to the flow table that matches packets that have their first trace indicator set and where the length of the recorded route (e.g., which represents the number of flow tables and groups traversed by the packet so far) is larger than a predefined configurable threshold length (max_length). The flow entry has an instruction to send the packet to the controller 100. This flow entry can be added to all flow tables for which packet tracing is enabled (or a subset thereof). In one embodiment, the controller 100 may determine that a packet is stuck in a loop based on receiving a packet with a recorded route length that has reached the predefined configurable threshold length. In one embodiment, if the configurable threshold length (max_length) is set to zero (or other predefined value), then there is no limit to the length of the recorded route.

In one embodiment, OpenFlow is extended to provide an action to append an identifier to a recorded route of a packet (referred to as a record-route action). As shown below, a record-route action type (OFPAT_RECORD_ROUTE) can be added to the list of action types. Also, as shown below, a record-route action structure (ofp_action_record_route) can be provided. The record-route action structure includes a field ("id" field) to specify the identifier of the flow table or group that to append to the recorded route.

Figure 4:
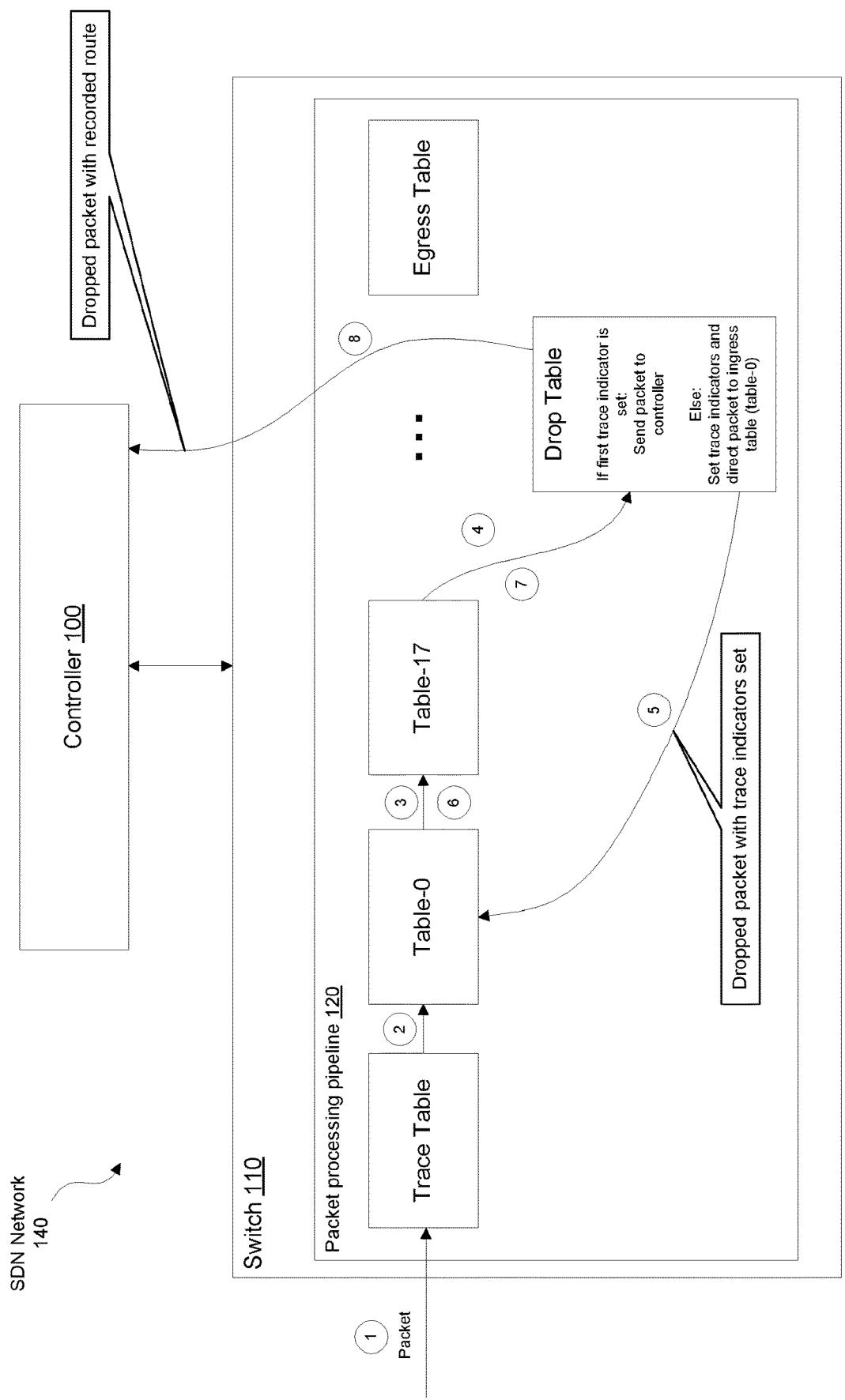
FIG. 4 is a diagram illustrating operations for tracing a dropped packet in a packet processing pipeline of an SDN switch, according to some embodiments.

FIG. 4 is a diagram illustrating operations for tracing a dropped packet in a packet processing pipeline of an SDN switch, according to some embodiments. As shown in the diagram, the switch 110 includes a drop table. In one embodiment, all drop instructions (e.g., OpenFlow drop actions) and/or default instructions in the flow tables are replaced with instructions to direct the packet to the drop table. As shown in the diagram, in one embodiment, the drop table is programmed to cause a packet to be processed in the following manner: if the first trace indicator of the packet is set, send the packet to the controller; otherwise, set the trace indicators of the packet (first trace indicator and second trace indicator) and direct the packet to the ingress table.

Exemplary operations for tracing dropped packets will now be described with reference to the diagram. At operation 1, the switch 110 receives a packet. Packet processing for the packet begins at the trace table of the packet processing pipeline 120. In this example, it is assumed that the packet does not match a trace criteria. At operation 2, the trace packet is directed to the ingress table (table-0), and at operation 3, the packet is directed to table-17. When the packet is at table-17, it is determined that the packet should be dropped. As such, at operation 4, the packet is directed to the drop table. When the packet is at the drop table, since the first trace indicator of the packet is not set, the switch 110 sets the trace indicators of the packet (the first trace indicator and the second trace indicator) and directs the packet back to the ingress table (table-0). This allows the packet to go through the packet processing pipeline 120 again, but this time with packet tracing enabled. When the packet is at table-0, since tracing is enabled for the packet, the switch 110 appends the identifier of table-0 to the recorded route of the packet and at operation 6, directs the packet to table-17

(with the first trace indicator set). When the packet is at table-17, the switch 110 appends the identifier of table-17 to the recorded route of the packet. At operation 7, the packet is directed to the drop table (with the first trace indicator set). Since the first trace indicator of the packet is set, the switch 110 sends the packet to the controller 100 along with the recorded route, which in this example is "0→17." In this manner, the switch 110 can enable packet tracing for dropped packets even if the dropped packets do not match a trace criteria. In one embodiment, the drop table is programmed to only perform packet tracing for certain packets (e.g., by only directing those packets to the ingress table).

Figure 5:
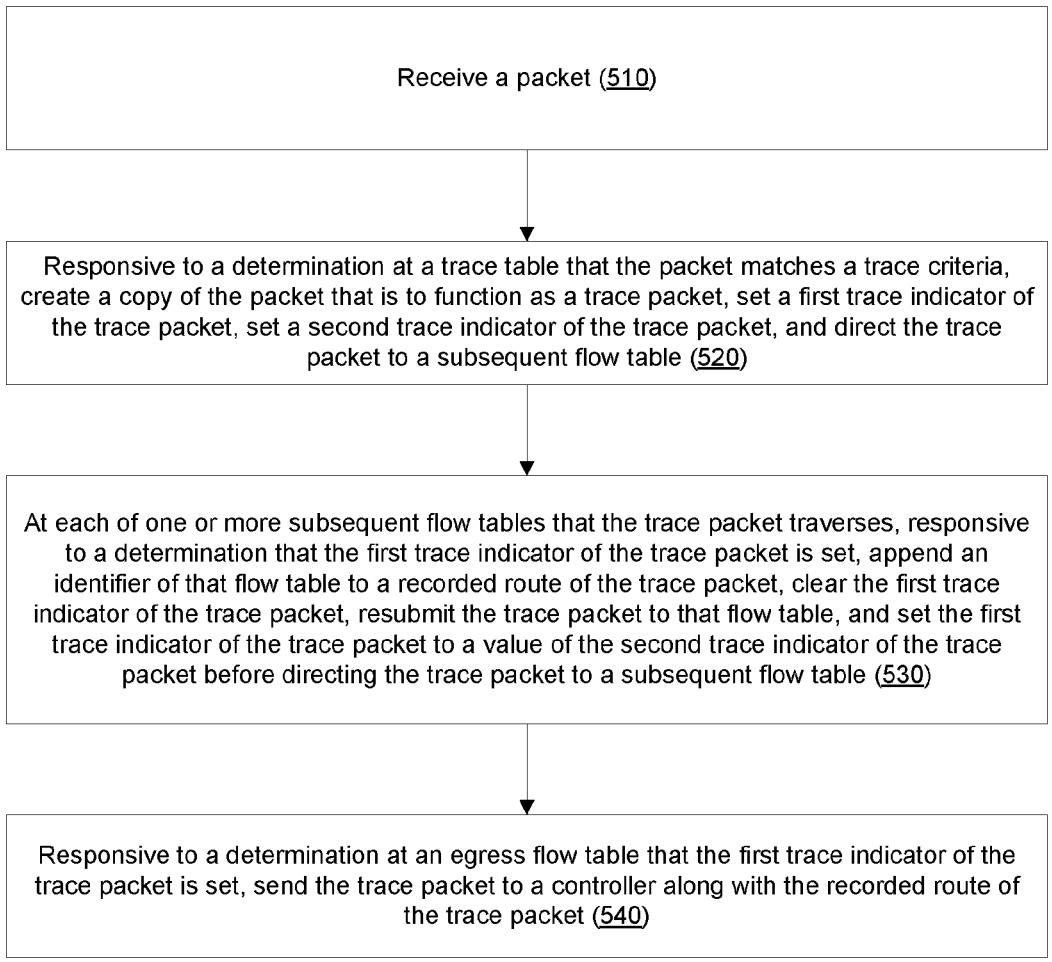
FIG. 5 is a flow diagram of a process for tracing a packet in a packet processing pipeline of an SDN switch, according to some embodiments.

FIG. 5 is a flow diagram of a process for tracing a packet in a packet processing pipeline of an SDN switch, according to some embodiments. The operations in the flow diagram will be described with reference to the exemplary embodiments of the other figures. However, it should be understood that the operations of the flow diagram can be performed by embodiments other than those discussed with reference to the other figures, and the embodiments discussed with reference to these other figures can perform operations different than those discussed with reference to the flow diagram. In one embodiment, the process is implemented by a switch in an SDN network (e.g., switch 110 in SDN network 140).

At block 510, the switch 110 receives a packet.

At block 520, responsive to a determination at a trace table that the packet matches a trace criteria, the switch 110 creates a copy of the packet that is to function as a trace packet, sets a first trace indicator of the trace packet, sets a second trace indicator of the trace packet, and directs the trace packet to a subsequent flow table (e.g., an ingress flow table). As used herein, an operation that is performed as part of processing a packet in a packet processing pipeline 120 according to a particular flow table or group (e.g., matching the packet against flow entries of the flow table, executing instructions of a flow entry of the flow table, and executing instructions of a bucket of the group) is said to be performed "at" that flow table or group. In one embodiment, the packet (the original packet as opposed to the trace packet) is to be processed through the remainder of the packet processing pipeline 120 without being traced. In one embodiment, the first trace indicator of the trace packet is a bit in a metadata field (e.g., OpenFlow metadata field) associated with the trace packet. In one embodiment, the second trace indicator of the trace packet is a bit in a packet register (e.g., OpenFlow packet register) associated with the trace packet.

At block 530, at each of one or more subsequent flow tables that the trace packet traverses, responsive to a determination that the first trace indicator of the trace packet is set, the switch 110 appends an identifier of that flow table to a recorded route of the trace packet, clears the first trace indicator of the trace packet, resubmits the trace packet to that flow table, and sets the first trace indicator of the trace packet to a value of the second trace indicator of the trace packet before directing the race packet to a subsequent flow table. In one embodiment, an identifier of a flow table is appended to the recorded route of the trace packet based on applying a record-route action included in a flow entry.

In one embodiment, the switch 110 appends, at a group, an identifier of the group to a recorded route of the trace packet and directs the trace packet to the egress flow table. In one embodiment, the switch 110 appends, at a group, an identifier of the group to a recorded route of the trace packet for each bucket of the group.

In one embodiment, the switch determines that the trace packet is in a loop in response to a determination that the length of the recorded route of the trace packet exceeds a preconfigured threshold length and sends the trace packet to the controller along with the recorded route of the trace packet in response to a determination that the trace packet is in a loop.

In one embodiment, responsive to a determination that the packet is to be dropped and a first trace indicator of the packet is not set, the switch sets a first trace indicator of the packet, sets a second trace indicator of the packet, and directs the packet to an ingress flow table (to be traced).

At block 540, responsive to a determination at an egress flow table that the first trace indicator of the trace packet is set, the switch 110 sends the trace packet to a controller along with the recorded route of the trace packet (e.g., using an OpenFlow Packet-In message).

FIG. 6A illustrates connectivity between network devices (NDs) within an exemplary network, as well as three exemplary implementations of the NDs, according to some embodiments. FIG. 6A shows NDs 600A-H, and their connectivity by way of lines between 600A-600B, 600B-600C, 600C-600D, 600D-600E, 600E-600F, 600F-600G, and 600A-600G, as well as between 600H and each of 600A, 600C, 600D, and 600G. These NDs are physical devices, and the connectivity between these NDs can be wireless or wired (often referred to as a link). An additional line extending from NDs 600A, 600E, and 600F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a special-purpose operating system (OS); and 2) a general purpose network device 604 that uses common off-the-shelf (COTS) processors and a standard OS.

The special-purpose network device 602 includes networking hardware 610 comprising a set of one or more processor(s) 612, forwarding resource(s) 614 (which typically include one or more ASICs and/or network processors), and physical network interfaces (NIs) 616 (through which network connections are made, such as those shown by the connectivity between NDs 600A-H), as well as non-transitory machine readable storage media 618 having stored therein networking software 620. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A).

Software 620 can include code such as tracing component 625, which when executed by networking hardware 610, causes the special-purpose network device 602 to perform operations of one or more embodiments described herein above as part networking software instances 622 (e.g., to provide packet tracing functionality).

The special-purpose network device 602 is often physically and/or logically considered to include: 1) a ND control plane 624 (sometimes referred to as a control plane) comprising the processor(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the processor(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

FIG. 6B illustrates an exemplary way to implement the special-purpose network device 602 according to some embodiments. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and physical NIs 646, as well as non-transitory machine readable storage media 648 having stored therein software 650. During operation, the processor(s) 642 execute the software 650 to instantiate one or more sets of one or more applications 664A-R. While one embodiment does not implement virtualization, alternative embodiments may use different forms of virtualization. For example, in one such alternative embodiment the virtualization layer 654 represents the kernel of an operating system (or a shim executing on a base operating system) that allows for the creation of multiple instances 662A-R called software containers that may each be used to execute one (or more) of the sets of applications 664A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 654 represents a hypervisor (sometimes referred to as a virtual machine monitor (VMM)) or a hypervisor executing on top of a host operating system, and each of the sets of applications 664A-R is run on top of a guest operating system within an instance 662A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 640, directly on a hypervisor (in which case the unikernel is sometimes described as running within a LibOS virtual machine), or in a software container, embodiments can be implemented fully with unikernels running directly on a hypervisor represented by virtualization layer 654, unikernels running within software containers represented by instances 662A-R, or as a combination of unikernels and the above-described techniques (e.g., unikernels and virtual machines both run directly on a hypervisor, unikernels and sets of applications that are run in different software containers).

The instantiation of the one or more sets of one or more applications 664A-R, as well as virtualization if implemented, are collectively referred to as software instance(s) 652. Each set of applications 664A-R, corresponding virtualization construct (e.g., instance 662A-R) if implemented, and that part of the hardware 640 that executes them (be it hardware dedicated to that execution and/or time slices of hardware temporally shared), forms a separate virtual network element(s) 660A-R.

The virtual network element(s) 660A-R perform similar functionality to the virtual network element(s) 630A-R—e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments are illustrated with each instance 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 662A-R to VNEs also apply to embodiments where such a finer level of granularity and/or unikernels are used.

In certain embodiments, the virtualization layer 654 includes a virtual switch that provides similar forwarding services as a physical Ethernet switch. Specifically, this virtual switch forwards traffic between instances 662A-R and the physical NI(s) 646, as well as optionally between the instances 662A-R; in addition, this virtual switch may enforce network isolation between the VNEs 660A-R that by policy are not permitted to communicate with each other (e.g., by honoring virtual local area networks (VLANs)).

Software 650 can include code such as tracing component 663, which when executed by processor(s) 642, cause the general purpose network device 604 to perform operations of one or more embodiments described herein above as part software instances 662A-R (e.g., to provide packet tracing functionality).

The third exemplary ND implementation in FIG. 6A is a hybrid network device 606, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 6C:
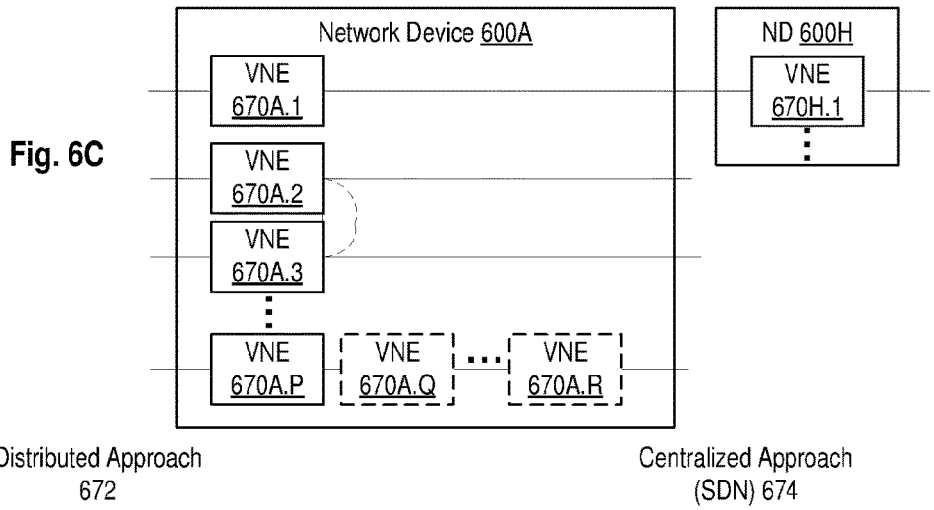
FIG. 6C illustrates various exemplary ways in which virtual network elements (VNEs) may be coupled according to some embodiments.

FIG. 6C illustrates various exemplary ways in which VNEs may be coupled according to some embodiments. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the software instances 662A-R may operate as servers; the same would be true for the hybrid network device 606; in the case of the special-purpose network device 602, one or more such servers could also be run on a virtualization layer executed by the processor(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 6D:
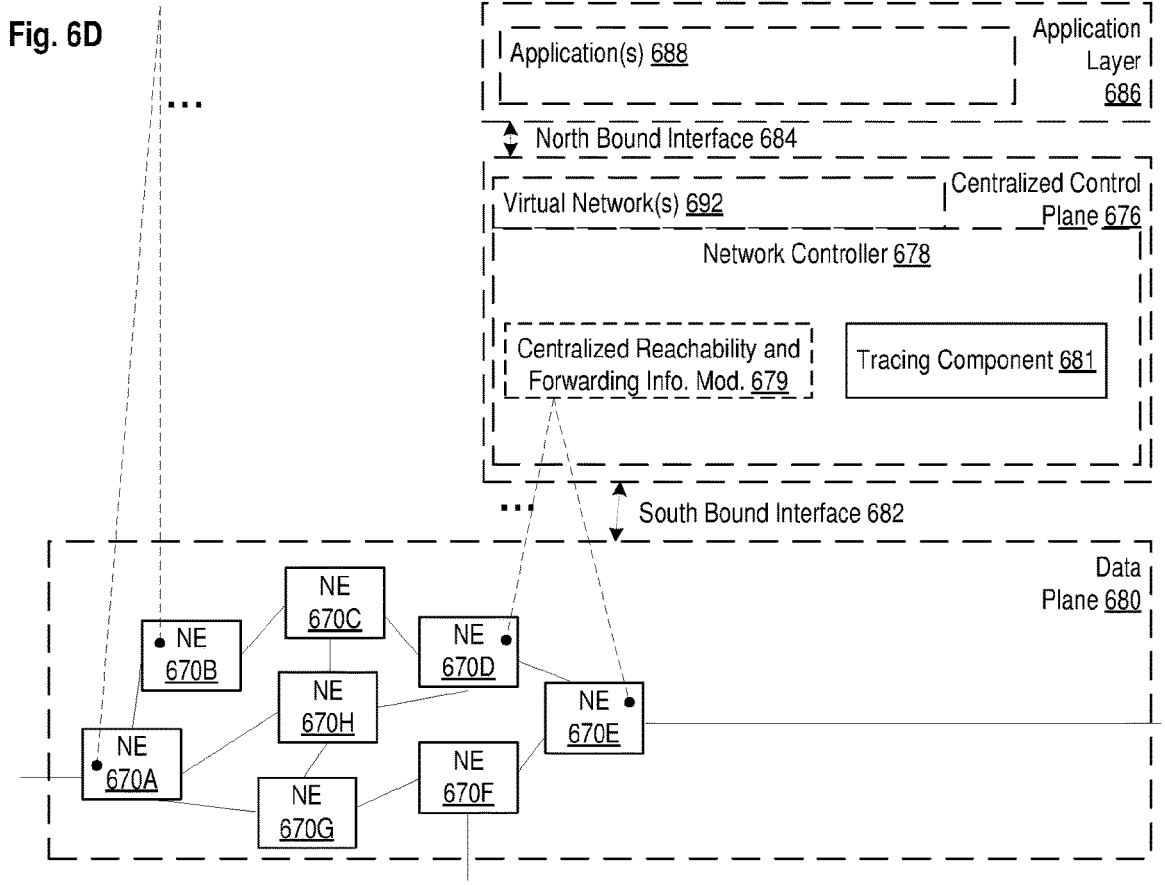
FIG. 6D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments.

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 670A-H (e.g., the processor(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs.

In one embodiment, the network controller 678 may include a tracing component 681 that when executed by the network controller 678, causes the network controller 678 to perform operations of one or more embodiments described herein above (e.g., operations to set up the packet tracing infrastructure in a switch, which may involve programming the trace table, one or more normal tables, and the egress table in the switch).

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the processor(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D shows the distributed approach 672 separate from the centralized approach 674, the effort of network control may be distributed differently or the two combined in certain embodiments. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

Figure 6E:
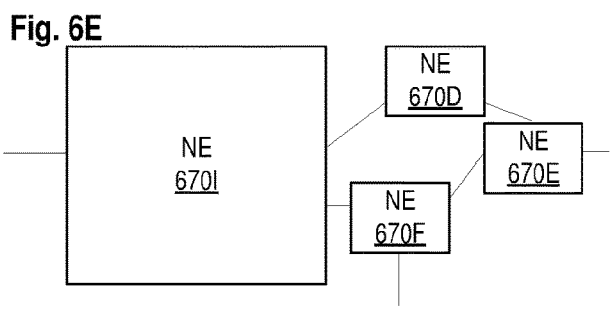
FIG. 6E illustrates the simple case of where each of the NDs implements a single NE, but a centralized control plane has abstracted multiple of the NEs in different NDs into (to represent) a single NE in one of the virtual network(s), according to some embodiments.
Figure 6F:
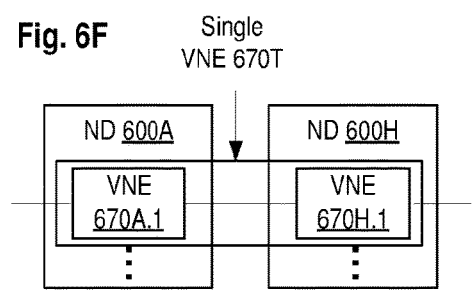
FIG. 6F illustrates a case where multiple VNEs are implemented on different NDs and are coupled to each other, and where a centralized control plane has abstracted these multiple VNEs such that they appear as a single VNE within one of the virtual networks, according to some embodiments.

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments. FIG. 6E shows that in this virtual network, the NE 6701 is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments. Thus, the abstraction of a NE or VNE can span multiple NDs.

While some embodiments implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
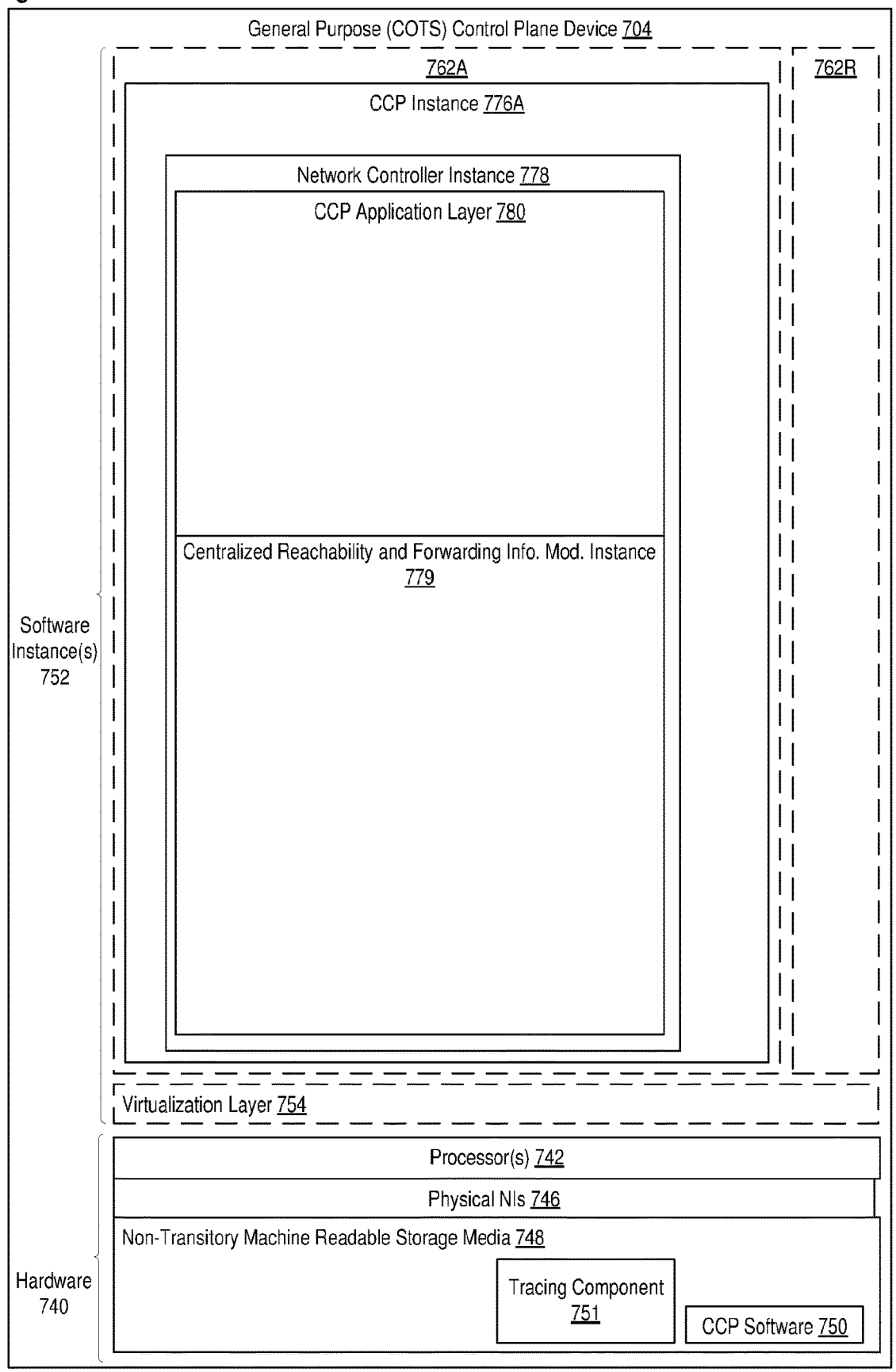
FIG. 7 illustrates a general purpose control plane device with centralized control plane (CCP) software 750), according to some embodiments.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include processor(s), a set or one or more physical NIs, and a non-transitory machine-readable storage medium having stored thereon the centralized control plane software. For instance, FIG. 7 illustrates, a general purpose control plane device 704 including hardware 740 comprising a set of one or more processor(s) 742 (which are often COTS processors) and physical NIs 746, as well as non-transitory machine readable storage media 748 having stored therein centralized control plane (CCP) software 750 and a tracing component 751.

In embodiments that use compute virtualization, the processor(s) 742 typically execute software to instantiate a virtualization layer 754 (e.g., in one embodiment the virtualization layer 754 represents the kernel of an operating system (or a shim executing on a base operating system) that allows for the creation of multiple instances 762A-R called software containers (representing separate user spaces and also called virtualization engines, virtual private servers, or jails) that may each be used to execute a set of one or more applications; in another embodiment the virtualization layer 754 represents a hypervisor (sometimes referred to as a virtual machine monitor (VMM)) or a hypervisor executing on top of a host operating system, and an application is run on top of a guest operating system within an instance 762A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 740, directly on a hypervisor represented by virtualization layer 754 (in which case the unikernel is sometimes described as running within a LibOS virtual machine), or in a software container represented by one of instances 762A-R). Again, in embodiments where compute virtualization is used, during operation an instance of the CCP software 750 (illustrated as CCP instance 776A) is executed (e.g., within the instance 762A) on the virtualization layer 754. In embodiments where compute virtualization is not used, the CCP instance 776A is executed, as a unikernel or on top of a host operating system, on the "bare metal" general purpose control plane device 704. The instantiation of the CCP instance 776A, as well as the virtualization layer 754 and instances 762A-R if implemented, are collectively referred to as software instance(s) 752.

In some embodiments, the CCP instance 776A includes a network controller instance 778. The network controller instance 778 includes a centralized reachability and forwarding information module instance 779 (which is a middleware layer providing the context of the network controller 678 to the operating system and communicating with the various NEs), and an CCP application layer 780 (sometimes referred to as an application layer) over the middleware layer (providing the intelligence required for various network operations such as protocols, network situational awareness, and user-interfaces). At a more abstract level, this CCP application layer 780 within the centralized control plane 676 works with virtual network view(s) (logical view(s) of the network) and the middleware layer provides the conversion from the virtual networks to the physical view.

The tracing component 751 can be executed by hardware 740 to perform operations of one or more embodiments described herein above as part of software instances 752 (e.g., operations to set up the packet tracing infrastructure in a switch, which may involve programming the trace table, one or more normal tables, and the egress table in the switch).

The centralized control plane 676 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 676 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments as described herein.

An embodiment may be an article of manufacture in which a non-transitory machine-readable medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

In the foregoing specification, embodiments have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method by a switch in a software defined networking (SDN) network to trace packets in a packet processing pipeline of the switch, comprising:
   receiving a packet;
   responsive to a determination at a trace table in the packet processing pipeline that the packet matches a trace criteria, creating a copy of the packet that is to function as a trace packet, setting a first trace indicator of the trace packet, setting a second trace indicator of the trace packet, and directing the trace packet to a subsequent flow table;
   at each of one or more subsequent flow tables in the packet processing pipeline that the trace packet traverses, responsive to a determination that the first trace indicator of the trace packet is set, appending an identifier of that flow table to a recorded route of the trace packet, clearing the first trace indicator of the trace packet, resubmitting the trace packet to that flow table, and setting the first trace indicator of the trace packet to a value of the second trace indicator of the trace packet before directing the trace packet to a subsequent flow table; and
   responsive to a determination at an egress flow table in the packet processing pipeline that the first trace indicator of the trace packet is set, sending the trace packet to a controller along with the recorded route of the trace packet.

2. The method of claim 1, wherein the packet is to be processed through a remainder of the packet processing pipeline without being traced.

3. The method of claim 1, wherein the first trace indicator of the trace packet is a bit in a metadata field associated with the trace packet.

4. The method of claim 1, wherein an identifier of a flow table is appended to the recorded route of the trace packet based on applying a record-route action included in a flow entry.

5. The method of claim 1, wherein the second trace indicator of the trace packet is a bit in a packet register associated with the trace packet.

6. The method of claim 1, further comprising:
   appending, at a group, an identifier of the group to a recorded route of the trace packet and directing the trace packet to the egress flow table.

7. The method of claim 1, further comprising:
   appending, at a group, an identifier of the group to a recorded route of the trace packet for each bucket of the group.

8. The method of claim 1, further comprising:
   determining that the trace packet is in a loop in response to a determination that a length of the recorded route of the trace packet exceeds a preconfigured threshold length; and
   sending the trace packet to the controller along with the recorded route of the trace packet in response to a determination that the trace packet is in a loop.

9. The method of claim 1, responsive to a determination that the packet is to be dropped and a first trace indicator of the packet is cleared, setting a first trace indicator of the packet, setting a second trace indicator of the packet, and directing the packet to an ingress flow table.

10. A network device to function as a switch in a software defined networking (SDN) network to trace packets in a packet processing pipeline of the switch, the network device comprising:

a set of one or more processors; and a non-transitory machine-readable storage medium having stored therein a tracing component, which when executed by the set of one or more processors, causes the switch to receive a packet, responsive to a determination at a trace table in the packet processing pipeline that the packet matches a trace criteria, create a copy of the packet that is to function as a trace packet, set a first trace indicator of the trace packet, set a second trace indicator of the trace packet, and direct the trace packet to a subsequent flow table, at each of one or more subsequent flow tables in the packet processing pipeline that the trace packet traverses, responsive to a determination that the first trace indicator of the trace packet is set, append an identifier of that flow table to a recorded route of the trace packet, clear the first trace indicator of the trace packet, resubmit the trace packet to that flow table, and set the first trace indicator of the trace packet to a value of the second trace indicator of the trace packet before directing the trace packet to a subsequent flow table, and response to a determination at an egress flow table in the packet processing pipeline that the first trace indicator of the trace packet is set, send the trace packet to a controller along with the recorded route of the trace packet.

11. The network device of claim 10, wherein the packet is to be processed through a remainder of the packet processing pipeline without being traced.

12. The network device of claim 10, wherein the first trace indicator of the trace packet is a bit in a metadata field associated with the trace packet.

13. The network device of claim 10, wherein an identifier of a flow table is appended to the recorded route of the trace packet based on applying a record route action specified in a flow entry.

14. The network device of claim 10, wherein the second trace indicator of the trace packet is a bit in a packet register associated with the trace packet.

15. The network device of claim 10, wherein the tracing component, when executed by the set of one or more processors, further causes the switch to add, at a group, an identifier of the group to a recorded route of the trace packet and direct the copy of the packet to the egress flow table.

16. A non-transitory machine-readable medium having computer code stored therein, which when executed by a set of one or more processors of a network device functioning as a switch in a software defined networking (SDN) network, causes the switch to perform operations for tracing packets in a packet processing pipeline of the switch, the operations comprising:

receiving a packet;

responsive to a determination at a trace table in the packet processing pipeline that the packet matches a trace criteria, creating a copy of the packet that is to function as a trace packet, setting a first trace indicator of the trace packet, setting a second trace indicator of the trace packet, and directing the trace packet to a subsequent flow table;

at each of one or more subsequent flow tables in the packet processing pipeline that the trace packet traverses, responsive to a determination that the first trace indicator of the trace packet is set, appending an identifier of that flow table to a recorded route of the trace packet, clearing the first trace indicator of the trace packet, resubmitting the trace packet to that flow table, and setting the first trace indicator of the trace packet to a value of the second trace indicator of the trace packet before directing the trace packet to a subsequent flow table; and responsive to a determination at an egress flow table in the packet processing pipeline that the first trace indicator of the trace packet is set, sending the trace packet to a controller along with the recorded route of the trace packet.

17. The non-transitory machine-readable medium of claim 16, wherein the packet is to be processed through a remainder of the packet processing pipeline without being traced.

18. The non-transitory machine-readable medium of claim 16, wherein the first trace indicator of the trace packet is a bit in a metadata field associated with the trace packet.

19. The non-transitory machine-readable medium of claim 16, wherein an identifier of a flow table is appended to the recorded route of the trace packet based on applying a record route action specified in a flow entry.

20. The non-transitory machine-readable medium of claim 16, wherein the second trace indicator of the trace packet is a bit in a packet register associated with the trace packet.

* * * * *